UNITED STATES PATENT OFFICE.

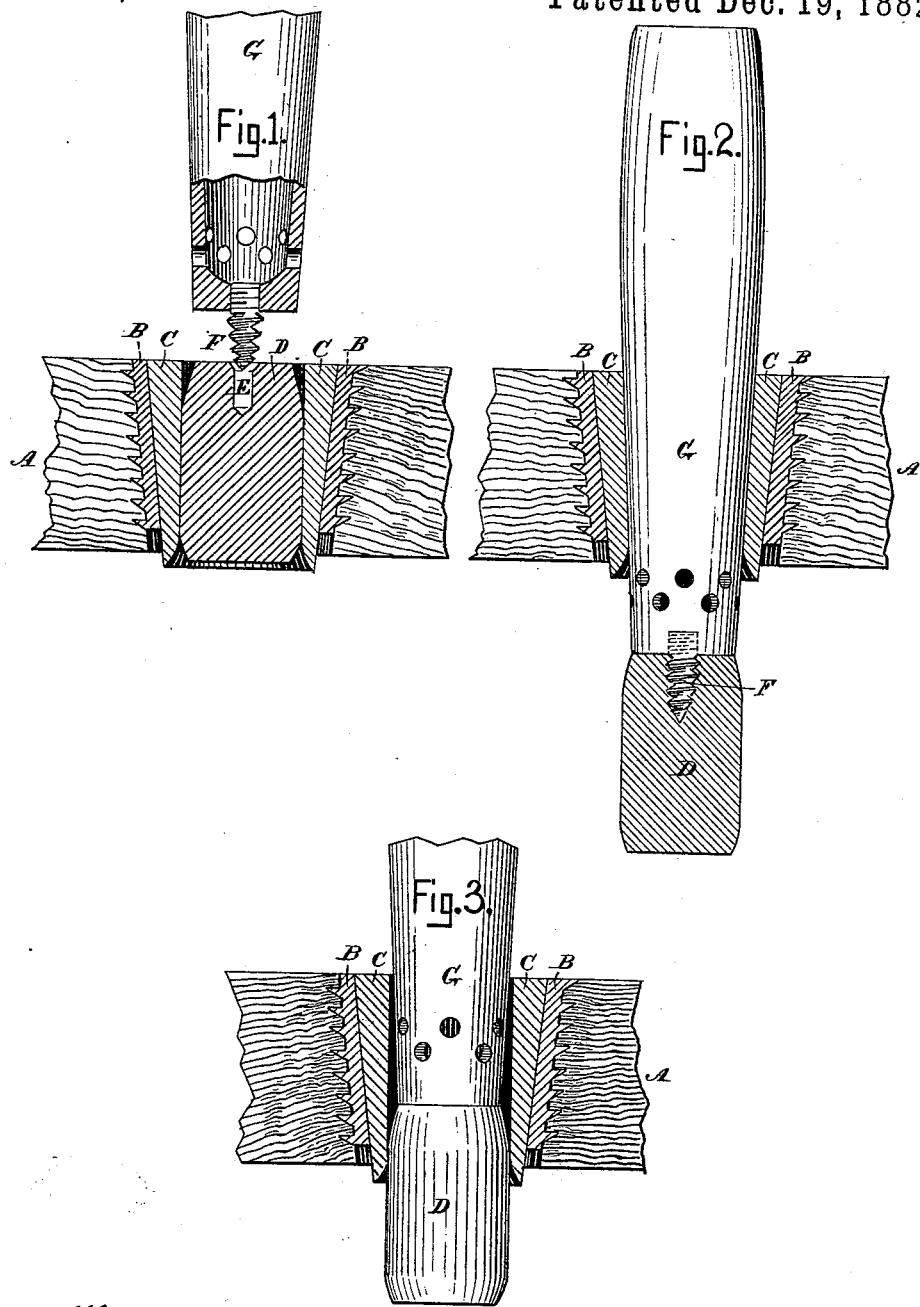

HENRY H. RUETER, OF BOSTON, MASSACHUSETTS.

CLOSING TAP-HOLES IN CASKS.

SPECIFICATION forming part of Letters Patent No. 269,469, dated December 19, 1882.

Application filed February 13, 1882. (No model.)

*To all whom it may concern:*

Be it known that I, HENRY H. RUETER, of Boston, in the county of Suffolk and Commonwealth of Massachusetts, have invented a new and useful improvement in appliances for and manner of closing the tap-holes in ale and beer casks when the faucet is removed therefrom, of which the following is a specification.

My invention relates to the faucet and to the plug used to close the tap-hole, the object of it being to provide means and a way to tightly close an empty ale or beer cask by the withdrawal of the faucet; and it consists in the form of the entering end of the faucet and the form of the tap-hole plug, and their combined use, as described below.

Under the present mode, when an ale or beer cask has been emptied by a consumer, the faucet (and the vent-tap, if there is one) is removed, the tap-hole being left open, and the cask is returned to the brewery; and it often happens that the cask remains in that condition some time before it is cleansed and used again; and in such case it is always exposed to the action of the atmosphere, and sometimes rain-water falls into it, and it is very liable to, and often will, become musty and moldy to a degree from which it is difficult and sometimes impossible to restore it to a condition suitable for use by any of the ordinary methods of cleansing, in consequence of which there is much expense and loss. It is therefore very desirable that such casks should have the tap-holes and vent-holes, if there are such, tightly closed when the faucet is removed, and so remain until cleansed for renewed use, as, if so closed and kept closed, casks may remain for a long time without taking injury.

By my invention an ale or beer cask in which it is used is tightly closed by the withdrawal of its faucet or faucets, if there is more than one, and will so remain until the tap-hole plug is removed.

In the drawings annexed, illustrating my invention, Figure 1 shows a faucet partially cut away at the entering end, with lateral holes in it to admit the passage of fluid into the main opening through it, and with a pointed spike or screw on it, which is to enter into the cavity E in the tap-hole plug, and a section of the head of a cask, with the tap-hole in it, and the tap-hole plug D in the tap-hole, and it also shows a metallic bushing, B, in the tap-hole, and a wooden packing, C, inside the metallic bushing, into which the tap-hole plug is fitted, and which will also receive the faucet when it is driven into place; but the metallic bushing and wooden packing, though very useful and desirable, are not indispensable to the use of this invention, as it may be applied with equal advantage to the cask when the tap-hole is simply bored through the wood of the cask, without the use of the metallic bushing, and with or without the wooden packing C.

The tap-hole plug D, as here shown and as used in practice, is tapered a little at both ends to provide for its ready entrance into the tap-hole, and the tap-hole is also made a little broader at its inner end than its general diameter, so that the tap-hole plug may readily enter it when it is drawn back. The tap-hole plug will be made with a cavity, E, bored in its outer end to receive the pointed spike or screw F, which will guide the faucet as it enters the tap-hole. The pointed spike or screw F may be a part of the metallic substance of the faucet punched on it; or it may be made a separate piece of steel or other suitable metal, and screwed into a hole in the end of the faucet made to receive it. It must be of sufficient size to give the requisite strength, and may be a spike indented or corrugated longitudinally or transversely, or in any other manner, or with smooth sides; or it may have a screw-thread on it; and in either form it will be driven into its place by a blow or blows on the faucet. When the spike or screw is driven to its place E a few more blows on the outer end of the faucet will drive the faucet and tap-hole plug together forward into the cask, the faucet engaging the sides of the tap-hole or wooden packing before the tap-hole plug has so far advanced that beer or gas can pass by it, thus making it impossible for any beer or gas to escape from the cask by the faucet during the process of inserting it in the cask, however inexperienced or unskillful the person inserting the faucet may be. When the faucet is driven in so that the lateral openings in its entering end are within the cask it will have the tap-hole plug securely fixed on the spike or screw on its entering end, as shown in Fig.

2. When the cask is empty and the faucet is withdrawn the tap-hole plug will be drawn into the tap-hole, but not entirely through it, as it will have expanded its diameter a little while immersed in the fluid, and will lodge in the tap-hole when it has entered it a short distance so firmly that it cannot be drawn farther, and the spike or screw will be drawn out of the tap-hole plug, leaving it in the tap-hole, as shown in Fig. 3. When the cask is cleaned and prepared for use again the tap-hole plug and the wooden packing, if used, will be removed and discarded as of no further use, and new ones will be supplied and inserted.

The advantages of the form of faucet and plug here described and the use of them together, as specified, are too obvious to need further explanation.

It will be understood that the faucet should be drawn out in such a manner as not to detach the plug from the spike or screw—that is to say, after the faucet has been loosened it must be drawn directly out, so as to draw the plug directly into the hole.

It will be obvious that the same devices may be applied to the vent without material alteration, the spike or screw being fixed on the end of the vent in the same manner as upon the faucet, and serving in like manner to draw back the plug into the vent-hole.

I am aware that a threaded point has been heretofore used in boring faucets, and I do not claim a point or projection on the end of such a faucet.

Having thus described my invention, I claim as new—

1. A driving-faucet having a spike or screw on its entering end, adapted to enter and retain the plug and to draw the same back into the hole, substantially as described.

2. A driving-faucet having a spike or screw on its entering end, in combination with a plug adapted to be pierced and held by the spike or screw, the whole being adapted to the bung or vent hole of a beer-barrel, substantially as described.

3. In combination with a faucet having a spike or screw on its entering end, a plug formed of material adapted to be entered and held by the said spike or screw, and said plug being tapered at its outer end, and the whole adapted to a bung or vent hole, substantially as described.

4. In combination with a faucet having a spike or screw on its entering end, a plug formed of material adapted to be entered and held by the spike or screw, and provided with a hole to enter the faucet, the whole being adapted to a bung or vent hole, substantially as described.

HENRY H. RUETER.

Witnesses:
  CHS. HOUGHTON,
  HENRY A. RUETER.